May 27, 1952 G. L. HELLER 2,597,992
APPARATUS FOR PRODUCTION OF CARBON BLACK
Filed July 3, 1948 4 Sheets-Sheet 1
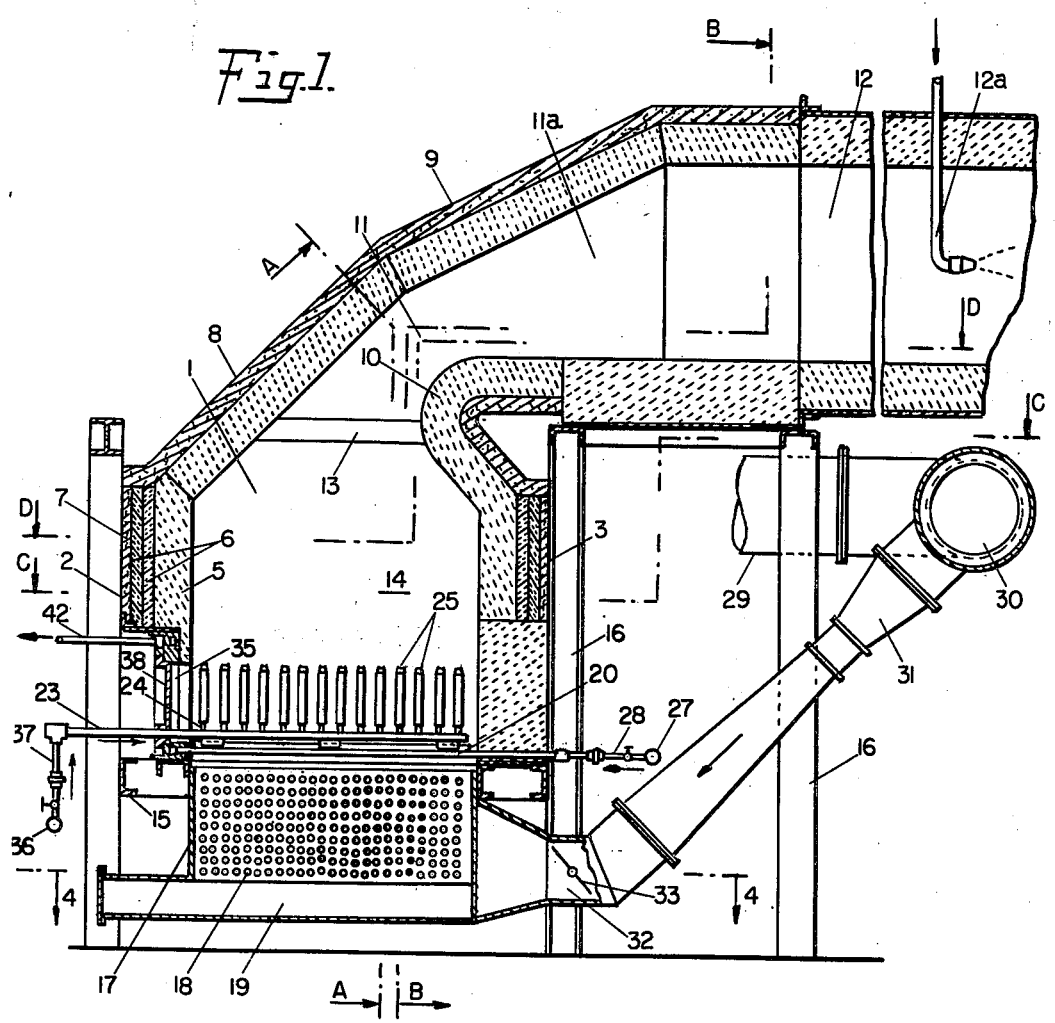
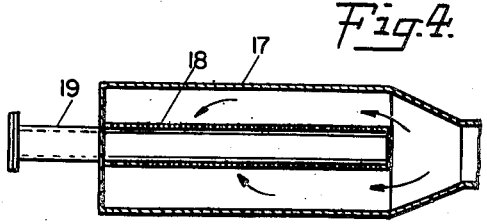
INVENTOR
GEORGE L. HELLER
ATTORNEYS May 27, 1952 G. L. HELLER 2,597,992
APPARATUS FOR PRODUCTION OF CARBON BLACK
Filed July 3, 1948 4 Sheets-Sheet 2
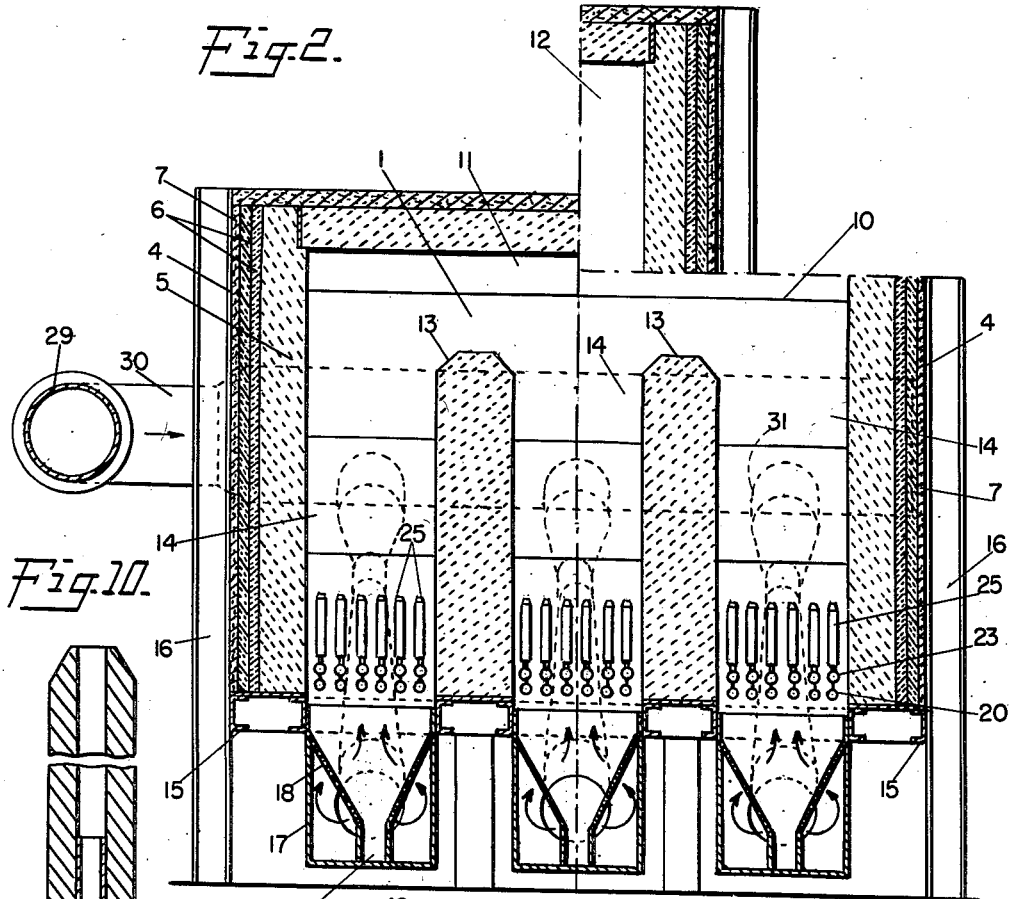

May 27, 1952 G. L. HELLER 2,597,992
APPARATUS FOR PRODUCTION OF CARBON BLACK
Filed July 3, 1948 4 Sheets-Sheet 3

INVENTOR
GEORGE L. HELLER
BY
ATTORNEYS

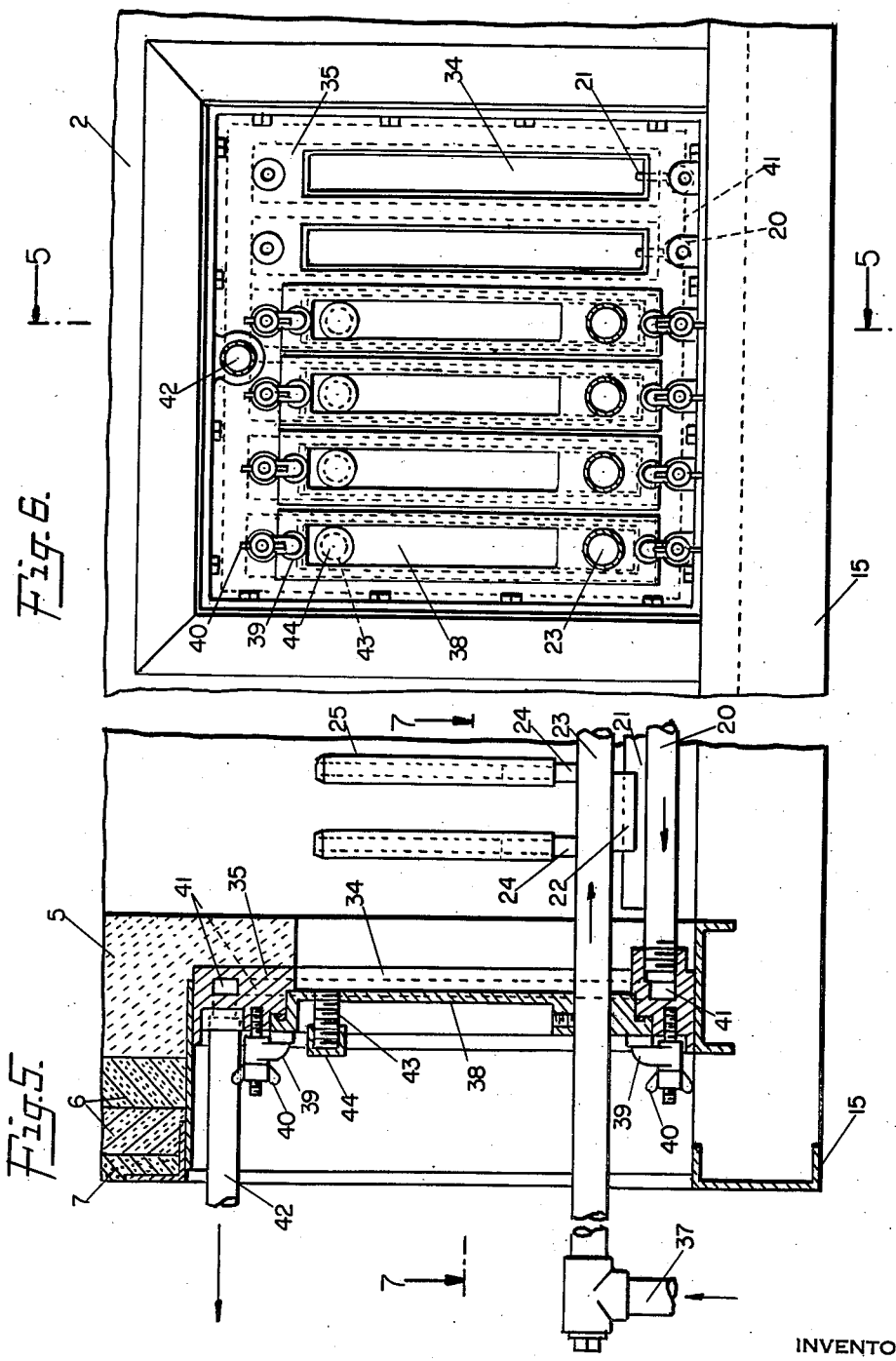

Patented May 27, 1952

2,597,992

UNITED STATES PATENT OFFICE 2,597,992

APPARATUS FOR PRODUCTION OF CARBON BLACK

George L. Heller, Monroe, La., assignor to Columbian Carbon Company

Application July 3, 1948, Serial No. 37,024

2 Claims. (Cl. 23—259.5)

This invention relates to novel apparatus especially adapted to the production of furnace carbons and of particular utility in the carrying out of the process described and claimed in my copending application Ser. No. 37,023 filed concurrently herewith.

Carbon pigments generally are formed by thermal decomposition of hydrocarbons brought about by their partial combustion or by heating them by some other means to the decomposition temperature of the hydrocarbons without substantial combustion thereof.

All carbon blacks are composed of extremely finely divided particles consisting primarily of carbon in some form, or forms, not fully understood. They vary widely as to their physical and chemical properties, including surface areas, and their influence upon compositions with which they are compounded, for instance, natural and synthetic rubbers, inks, lacquers, and the like.

Their particular characteristics, i. e., combined physical and chemical properties, appear to be influenced largely by the environment in which the particles are formed, the nature of the raw materials decomposed to form the carbon particles and the period of exposure to reaction temperatures following their liberation. The art has generally recognized that these factors influence the character of the product, but it has not been possible to vary at will the combined physical, chemical and compounding characteristics of the carbon black product. The art has been highly empirical.

It has more recently been discovered that an important factor in determining the rubber compounding characteristics of a carbon black is the environment of the hydrocarbons immediately prior to the carbon forming decomposition reaction. It has been found, for instance, that the character of the product is markedly influenced by preheating the hydrocarbons to a temperature at which a partial pyrolysis is effected prior to the carbon liberating decomposition.

The process of my above noted copending application utilized the principle of partial pyrolysis prior to the carbon forming decomposition of the hydrocarbons to a greater extent than heretofore possible in practical operations and in conjunction with a novel combination of other operating conditions so as to effect a smooth, uniform, highly efficient production of furnace carbons with a minimum of operating difficulties.

In general, the process comprises the burning of a gaseous hydrocarbon with an amount of air, sufficient only for partial combustion of the hydrocarbon, as a plurality of relatively small free flames in an unobstructed, highly heated chamber as it flows vertically from the upper ends of relatively small vertically positioned tubes, herein referred to as burner tubes, projecting a substantial distance upwardly through the chamber and exposed to direct radiant heat from the highly heated chamber walls, the air for supporting partial combustion of the hydrocarbons flowing upwardly around and between the burner tubes.

The velocity of flow of the gaseous hydrocarbons through the burner tubes is such as to provide sufficient time for the hydrocarbons to become highly heated to a temperature at which pyrolysis is initiated. But the time and temperature factors are so correlated as to minimize carbon liberation within the burner tubes.

In carrying out the process, it is necessary that the hydrocarbon gas be heated to an active conversion temperature before it issues from the respective burner tubes into the chamber atmosphere and that the heating be rapid. The necessary rapid heating is effected by passing the hydrocarbon gas through burner tubes of relatively small inside diameter, of sufficient length and so positioned with respect to the chamber walls as to be exposed to intense radiant heat from the walls, whereby the respective streams of gas are preheated to a temperature in excess of 1400° F. and, advantageously, 1600 to 2400° F. before passing from the burner tubes into the furnace atmosphere.

A difficulty heretofore experienced in passing highly heated hydrocarbons through small tubes has been the deposition of carbon or coke within the tubes necessitating frequent interruptions and troublesome cleaning operations. For continuous operation, it has been necessary to maintain expensive duplicate equipment, one furnace being cooled, cleaned and reheated, while the second is in operation.

My present apparatus is capable of substantially continuous operation. Any necessary cleaning or replacing of the burner tubes may be effected without interruption of normal operating conditions and with a minimum of mechanical difficulty. This is made possible by a novel arrangement of burner assemblies and the use of a multiplicity of such assemblies in a single furnace chamber whereby one assembly may be readily and quickly removed and replaced by a duplicate assembly where cleaning or replacement of the burner tubes becomes necessary.

The apparatus will be further described and illustrated with reference to the accompanying drawings which represent conventionally a particularly desirable embodiment of my invention and of which Figure 1 is a side vertical sectional elevation through lines 1—1 of Fig. 3;

Fig. 2 is an end sectional elevation, the left side of which is along lines A—A of Fig. 1. and the right side along lines B—B of Fig. 1;

Fig. 4 is a horizontal sectional view along lines 4—4 of Fig. 1;

Fig. 5 is a fragmentary detailed side vertical sectional view including a furnace door assembly along lines 5—5 of Fig. 6;

Fig. 6 is a somewhat enlarged front elevation of one section of the furnace, also including a furnace door assembly;

Fig. 8 is a detailed sectional view of the door frame;

Fig. 9 is a detailed sectional view of the door, and

Fig. 10 is a detailed front vertical sectional view, somewhat enlarged and fragmentary, of the burner assembly.

Figure 3:
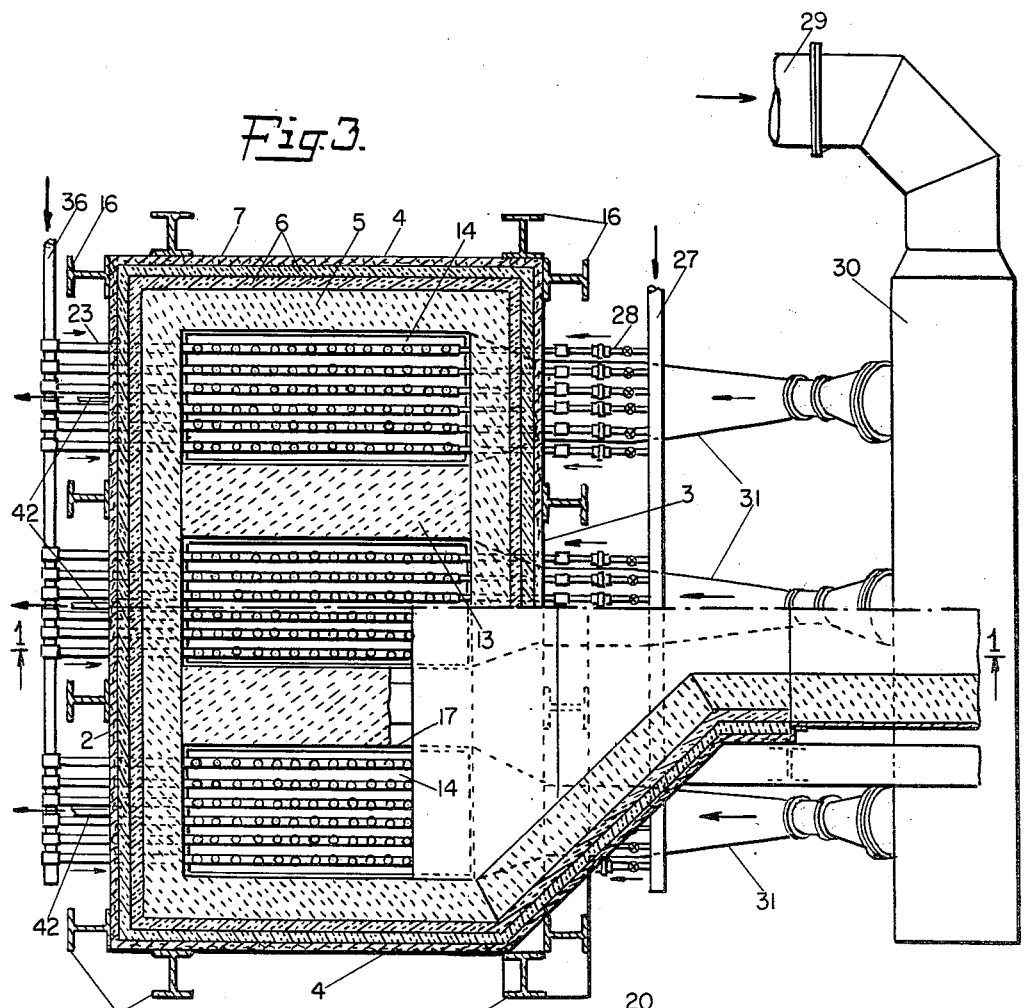
Fig. 3 is a horizontal sectional view, the upper side of which is along lines A—A of Fig. 1, and the lower half, along lines D—D of Fig. 1.
Figure 7:
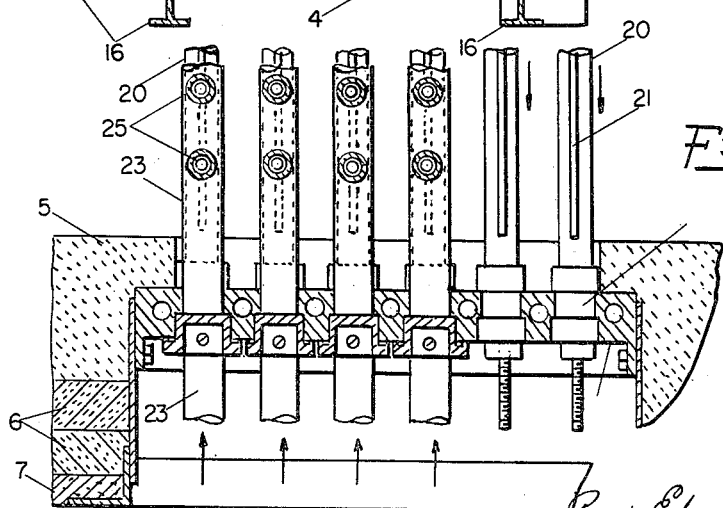
Fig. 7 is a fragmentary horizontal section along lines 7—7 of Fig. 5.

Referring more particularly to Figures 1, 2 and 3, the apparatus comprises a furnace chamber 1 having a front wall 2, a rear wall 3 and side walls 4 constructed of a furnace lining of firebrick 5, or other suitable furnace refractory covered on the outside by two layers of heat insulating material 6 encased in a hard air-tight cement coating 7, or a sheet metal casing, as more clearly appears from Figure 5. The upper end of chamber 1 is partially closed by the suspended roof members 8 and 9 and shoulder 10 forming a throat 11 which opens through breeching 11a into conduit 12 leading to conventional cooling and collecting apparatus.

As more clearly appears from Figure 2, the chamber 1 is divided by partitioning walls 13 extending from the front wall 2 to the rear wall 3 and constructed of firebrick to form three relatively narrow furnace ducts 14, each communicating at its upper end with the upper portion of chamber 1. These inner walls 13 and also the outer walls of the furnace are supported by horizontal channel irons 15 which, in turn, are supported by vertical structural steel members 16.

The ducts 14 extend downwardly beyond the furnace walls, the lower ends thereof being enclosed by a metal casing 17. The lower ends of the ducts are partitioned by inclined perforated metal plates 18, extending from front to rear of the ducts and forming a trough-shaped partition closed at each end and opening at its lower end into a cleanout conduit 19.

Positioned in the respective ducts above the perforated plates are a plurality of tubular supporting members 20 extending horizontally from the front to the rear of the duct, the respective members being parallel and adapted to be water cooled, each being provided with an upwardly extending flange 21, adapted to engage flange 22, extending downwardly from the burner pipe manifold 23, as more clearly appears from Fig. 10 of the drawing.

Spaced along manifold 23 are upwardly extending nipples 24 turned at their upper ends to fit into removable burner tubes 25 and to form a shoulder 26 for supporting the burner tube. Water, or other cooling fluid, is supplied to the supporting members 20 through manifold 27 and valved connecting lines 28 to avoid overheating and sagging of the supporting member.

Air for supporting the partial combustion of the hydrocarbon is supplied under pressure from a conventional blower through air duct 29 to manifold 30. From manifold 30, the air passes through the Venturi tubes 31 and connection 32 into the lower end of the ducts 14 beneath the perforated partitions 18. The Venturi tubes are provided with conventional equipment not shown for measuring the amount of air passed therethrough and the connections 32 are equipped with dampers, such as indicated at 33, for regulating and controlling the amount of air passed to the respective ducts 14.

In the particular apparatus shown, each of the three furnace ducts 14 is provided with six burner manifolds 23, each provided with fourteen burner tubes 25 and each individually supported by a supporting member 20. The burner manifolds project through narrow slots 34 in the doors 35 in the forward end of the respective furnace ducts 14, as more clearly appears from Figs. 1, 5 and 6. The first two slots from the right of the figure are shown with the burner assemblies removed, the slots being open. The remaining slots are shown with the burner assemblies in place and the slots closed by the closure members 38. The respective burner manifolds 23 are connected with gas supply manifold 36 by valved connection 37, each equipped with a union so that the connection may be readily broken.

The slots 34 in the doors of the respective furnace ducts are of sufficient height that once the connection 37 has been broken, an individual burner assembly including the burner manifold and the burner tubes may be withdrawn from the furnace duct intact through the slots for cleaning or replacement of burner tubes without disturbing the operation of the process. Under normal conditions, the slots 34 will be closed by the member 38 which is held in place by the lug 39 and the wing nut 40. This door assembly is also water cooled, cooling water flowing through supporting members 20 passing through ducts 41 in the door frame and, from thence, through conduit 42 leading to a manifold, not shown. Each of the closure members 38 is provided with a peephole 43 through which operation of the burner may be observed and which will normally be closed by cap 44.

In operation, natural gas, or other gaseous hydrocarbon, either enriched or unenriched and undiluted or diluted by steam, is supplied through gas manifold 36 and branch connection 37 to the respective burner manifolds 23. From the burner manifolds, the gaseous hydrocarbon passes upwardly through the respective burner tubes, is ignited as it flows from the upper end thereof and is burned as a quiescent vertical flame. The gaseous hydrocarbon may be preheated by conventional means before being passed into the manifold 36. However, it should not be preheated to a temperature sufficiently high to cause such decomposition of the hydrocarbon as might result in the coking or plugging of the tubes, generally not in excess of say 500° F. Where enriching oil is mixed with the gas, the oil used should have an end point not in excess of about 700° F. and, usually, the mixture should be preheated to a temperature in excess of its dew point.

Air for supporting the partial combustion of the gaseous hydrocarbon is supplied in measured quantity through the Venturi tubes 31 to the lower end of the furnace ducts 14 beneath the perforated plates and passes upwardly through the perforations in the plates, thereby being distributed uniformly through the transverse area of the furnace ducts. The arrangement of these perforated plates is such that any carbon, furnace scale, or other solid falling downwardly through the furnace will slide downwardly over the perforated plates into the conduit 19 thus avoiding clogging of the perforations.

The amounts of air and gas will be so regulated and proportioned as to cause their velocities to fall within the desired ranges. As the operation proceeds, the walls and roof members of the furnace chamber will become highly heated and will radiate heat to the furnace tubes 25 thereby preheating the gaseous hydrocarbons flowing therethrough to the desired temperature. The air flowing upwardly around the burner tubes will likewise be highly preheated, as previously described.

The gas issuing from the upper end of the respective burner tubes, under normal operations, will burn to produce a flame about 12 to 24 inches high, the lower end of which for the first three inches or so is usually a deep blue, above which there is a bright yellow zone in which the carbon particles appear to be rapidly formed in suspension. The resultant furnace gases with carbon particles suspended therein, pass through the throat 11 into the conduit 12 and, from thence, to conventional cooling and collecting apparatus. It is generally advantageous to provide water sprays, or the like, along conduit 12, as indicated at 12a, for the purpose of reducing the temperature of the suspension as is understood by the art.

The spacing of the burner tubes may be varied somewhat and I have found that the burner tube spacing definitely influences the characteristics of the furnace black product and optimum operating conditions, generally, for the production of a particular product. I have successfully used burner tube spacings ranging from 1½ inches between centers to as high as 8 inches between centers. I have found, however, that where the burner manifolds are spaced apart distances in the upper end of this range and the burner tubes on the respective burner manifolds are spaced like distances between centers, it is desirable to stagger the burner tubes on adjacent burner manifolds so as to give a more even distribution of the burner tubes over the transverse area of the furnace chamber. Such greater spacing of the burner tubes is usually desirable only where tubes of larger inside diameter, for instance, 1 inch, are used.

Generally, tube spacings within the lower end of the indicated range have been found to be more advantageous with respect to uniformity of operation. This is true both with respect to the spacing of the burner tubes on the individual burner manifolds and also the distance between adjacent manifolds. However, as previously noted, optimum burner tube spacing is, to a considerable extent, dependent upon the inside diameters of the burner tubes. Expressed as the ratio of tube spacing between centers to the inside diameter of the respective tubes, I have, with advantage, used tube spacings ranging from about 3.4:1 to 8.25:1. However, tube spacing equal to 6 to 8 times the inside diameter of the burner tubes has been found especially advantageous.

Specific examples of particular combinations of the number of tubes, inside diameters of the tubes, and lengths of the burner tubes and the spacing between centers of the tubes which have been used with advantage are set forth in the following table.

Table

| No. of tubes | Tube Diameters (inches) | Tube Lengths (inches) | Tube Spacing |
| --- | --- | --- | --- |
| 121 | 7/32 | 6 | 1½″ x 1½″. |
| 528 | 7/32 | 6 | 1½″ x 1⅝″. |
| 120 | ½ | 12 | 3½″ x 3½″. |
| 100 | 1 | 9 | 4″ x 4″. |
| 50 | 1 | 9 | 8″ staggered. |
| 30 | 1 | 9 | 7″ x 8¼″. |
| 16 | 1 | 9 | 4″ x 6″. |
| 231 | 7/32 | 6 | ¾″ x 1½″. |
| 81 | ½ | 12 | 1⅜″ x 2″. |
| 49 | ½ | 12 | 1⅜″ x 2″. |
| 25 | ½ | 12 | 3¾″ x 4″. |
| 16 | ½ | 12 | 4″ x 4″. |
| 102 | ½ | 12 | 3¼″ x 3½″. |
| 25 | ⅜ | 12 | 3¾″ x 3¾″. |
| 25 | ⅝ | 12 | 3¾″ x 3¾″. |
| 10 | 3/32 | 12 | 4″ x 4″. |
| 36 | 1 | 12 | 3½″ x 3¼″. |

In the particular apparatus shown in the drawing, the throat through which the furnace gases leave the furnace chamber is 1 foot 5⅜ inches across and extends the full width of the chamber 1, opening into the breeching leading to the conduit 12, the latter being 3 feet in diameter.

A particularly advantageous feature of the apparatus is the ease with which the burner tubes may be cleaned or replaced where necessary and the ready observation of the flames. The cleaning requirement will depend largely upon operating conditions and, particularly, the nature of the gaseous hydrocarbons used. Any irregularities in operation of a burner may be readily observed through the peepholes 43 and may be corrected by closing the valve and breaking the union in the manifold supply line 37, loosening the wing nuts 40 holding lugs 39 and removing the closure member 38. When this has been done, the individual burner assembly may be slid forward along support 20 and thus completely removed from the furnace through the slot 34. Thereafter, a conditioned burner assembly may be inserted, the closure member 38 replaced, the replaced burner manifold reconnected with gas manifold 36 and the operation continued. Thereafter, at the convenience of the operator, the withdrawn burner assembly may be reconditioned by removing the tubes 25 from the nipples 24, cleaning the tubes and reassembling the unit for further use, new burner tubes being substituted where desired.

By so positioning the upper edge of the supporting members 20, the respective burner assemblies may be slid forward and through the slot 34 with a minimum of difficulty. It will be understood, however, that, in its broader aspect, the invention is not restricted to the particular arrangement shown, but contemplates various modifications thereof.

Further, it will be understood that, instead of the perforated plates shown, other known means may be employed for effecting uniform distribution of the air over the transverse area of the furnace chamber and for minimizing turbulence of the air stream.

When the apparatus is used in conjunction with the process of my previously noted copending application, the velocity of the upwardly flowing air current is, with advantage, so correlated with the velocity of the gas streams leaving the burner tubes as to preserve the integrity of the respective flames and promote steady unflickering flames. In general, the velocity of the gas streams feeding the flames should be in excess of the velocity of the air stream at the point where the gas streams emerge from the burner tubes, advantageously at least 12 times that of the surrounding air. The air velocity is, with advantage, far less than that used in conventional furnace processes and, in general, should be of the order of 1 to 3 feet per second, or even as low as one-half foot per second. The slowly moving current of air moves upwardly through the furnace chamber which becomes highly heated to about 1600° F., or higher, and may, with advantage, be preheated to as high as 2300° F., or somewhat higher, depending upon other operating conditions of the hydrocarbon gas.

The fineness of subdivision of the incoming gaseous hydrocarbons, that is, the inside diameters of the burner tubes materially influences the uniformity of the reaction, the rapidity of heat transfer and the characteristics of the product. Reduction in diameters of the gas streams favors greater uniformity of the reaction, more rapid heat transfer and smaller particle size of the resultant carbon. Burner tubes having an inside diameter of ½ inch have been used with particular advantage. However, burner tubes having inside diameters as great as 1 inch and as small as $\frac{3}{32}$ inch have been used successfully. With the smaller burner tubes, the preheating time and temperatures are usually more critical as the tolerance for carbon formation in the burner tubes is somewhat less.

The composition and thickness of the burner tube walls are also important considerations since they influence the rate of absorption of radiant heat and the transmission of the heat to the gas stream. The tubes must be capable of withstanding the extremely high temperatures without cracking or deformation. Refractory tubes composed primarily of silicon carbide or of mullite or alumina and the like have been successfully employed.

Optimum burner tube length will depend upon the extent of preheating and extent of pyrolysis desired in a particular operation, the contemplated gas velocities through the tubes, the inside diameter of the particular tubes and the rate of absorption of radiant heat. Tubes of 6 to 12 inches in length have been successfully used, but tubes of even greater length may be employed. In general, the tubes should be so arranged as to be exposed as uniformly as is practical to heat radiation. This is facilitated by the use of relatively narrow furnace chambers, or ducts, so as to minimize the differences in distance of the respective tubes from the furnace walls and by so constructing the furnace roof and walls, as understood by the art, as to effect reflection of the required radiant heat therefrom onto the burner tubes. To this end, it is frequently more advantageous to use a number of smaller furnaces, or to employ a number of relatively small furnace ducts, confined by refractory heat reflecting walls, rather than to employ a single large chamber. Advantageously, the furnace chamber, or ducts, should be about 2 feet in width, but may be of somewhat greater length. However, depending upon contemplated operating conditions, furnace chambers of substantially greater dimensions may be frequently employed, with advantage.

I claim:
1. Apparatus for producing furnace carbons comprising a vertically elongated, relatively narrow, unobstructed furnace chamber, a plurality of vertically positioned, readily interchangeable burner tubes arranged in a uniform pattern over the entire transverse area of the chamber at a zone intermediate the height thereof, said tubes having an inside diameter of $\frac{3}{32}$ inch to 1 inch and being spaced between centers 3.4 to 8.5 times their inside diameters, the space between the tubes being substantially unobstructed, conduit means for supplying a gaseous hydrocarbon to the lower ends of the respective tubes, conduit means for supplying air to the lower end of the furnace chamber, air distributing means extending across the lower end of the furnace chamber for distributing air uniformly over the transverse area of the chamber and consisting of at least one upwardly inclined perforated surface positioned in the lower end of the furnace chamber directly beneath the burner assembly but above the inlet from the air supply conduit, at an angle such that solid particles dropping from the furnace chamber will not accumulate thereon, an outlet for furnace gases at the upper end of the furnace chamber, the chamber being confined by heat refractory walls so constructed that the tubes are subjected to intense radiant heat from the latter.

2. The apparatus of claim 1 in which the furnace chamber is of rectangular horizontal section and the burner tubes are arranged in a plurality of parallel rows, the tubes of each row being connected at their lower ends with, and supported by, a separate burner manifold pipe to constitute a separate, independent, burner assembly, an opening in one end wall of the furnace chamber perpendicular to said rows, at the end of each burner assembly and of a height and width at least equal to that of the respective burner assemblies and adapted to be closed by separate and readily removable closure members, a plurality of parallel supporting members for the respective burner assemblies extending horizontally from a level about flush with the lower end of the respective openings to the opposite wall of the chamber, one such opening and supporting member being provided for each burner assembly, the respective supporting members being adapted to permit the sliding of the burner assembly along the support and through the corresponding openings, the forward ends of each such manifold pipe extending through the respective openings to without the chamber and conduit means for supplying gas to the outer end of each of the burner manifold pipes.

GEORGE L. HELLER.

REFERENCES CITED

The following references are of record in the file of this patent:

UNITED STATES PATENTS

| Number | Name | Date |
|---|---|---|
| 1,360,984 | Charewiez | Nov. 30, 1920 |
| 1,508,367 | Matlock | Sept. 9, 1924 |
| 1,617,074 | Matlock | Feb. 8, 1927 |
| 1,844,932 | Chadwick et al. | Feb. 16, 1932 |
| 1,904,469 | Keller | Apr. 18, 1933 |
| 1,999,541 | Keller | Apr. 30, 1935 |
| 2,173,825 | Curtis et al. | Sept. 26, 1939 |
| 2,196,496 | Hamm | Apr. 9, 1940 |
| 2,247,859 | Purtell | July 1, 1941 |
| 2,462,026 | Loving | Feb. 15, 1949 |